United States Patent [19]

Korngiebel et al.

[11] Patent Number: 5,416,914
[45] Date of Patent: May 16, 1995

[54] MANAGEMENT OF REMOVABLE MEDIA FOR MULTIPLE DEVICE TYPES

[75] Inventors: Ronald W. Korngiebel, Broomfield; Michael L. Leonhardt, Longmont; Charles A. Milligan, Golden, all of Colo.

[73] Assignee: Storage Technology Corporation, Louisville, Colo.

[21] Appl. No.: 743,250

[22] Filed: Aug. 9, 1991

[51] Int. Cl.$^6$ ............... G11B 15/00; G11B 17/22
[52] U.S. Cl. ................... 395/425; 364/478; 369/34
[58] Field of Search ........... 364/478, 401; 360/92; 395/425; 369/34

[56] References Cited

U.S. PATENT DOCUMENTS 4,527,262 7/1985 Manto ........................... 369/33
5,164,909 11/1992 Leonhardt et al. ............. 364/478

OTHER PUBLICATIONS

"Toshiba Predicts IBM to Spur 4 MB Drive Demand"; *Newsbytes News Network* Jun. 13, 1991.

*Primary Examiner*—Joseph L. Dixon
*Assistant Examiner*—Reginald Bragdon
*Attorney, Agent, or Firm*—Duft, Graziano & Forest

[57] ABSTRACT

The removable media management system operates with a manual, an automated, or a combination of subsets of manual and automated library system to store and retrieve media cartridges for an associated plurality of drive elements. This system enables the use of a plurality of types of media within the single monolithic cartridge library system and a corresponding plurality of drive elements associated with said library system. Thus, each drive element has associated therewith a number of object storage locations within the library system which contains media of a form and content that matches the drive element. The removable media management system maps the correspondence between object storage location, media type, designated drive element in a manner such that the single library is partitioned into subsets for the user, i.e., the removable media management system provides the capability to define subsets of media types which have consistent mechanical and electrical characteristics, but can vary in data management attributes. This enables the user to transition to another media on an incremental basis, since a single drive element can be added to the library and associated media added as needed without displacing the embedded base (independent of vendor) of installed media handling processes or software or equipment or requiring significant modification to these.

32 Claims, 14 Drawing Sheets

VOLUME ATTRIBUTES

| VOLSER | LOCATION | TYPE | SUBTYPE | FORMAT | LENGTH | FORM | MGT. |
|---|---|---|---|---|---|---|---|
| 136392 | M1/R4/C8 | TAP | 4MM | ICRC | 1200 | 3480 | READ |
| 743490 | M1/R0/C6 | TAP | 1/2IN | ICRC | 1800 | 3480 | R/W |
| 547492 | M2/R5/C1 | DSK | HARD | ICRC | 600 | 3480 | R/W |
| . | . | . | . | . | . | . | . |

DRIVE ATTRIBUTES

| LOCATION | TYPE | SUBTYPE | SP/EDT* | FORM | SPEC | MGT |
|---|---|---|---|---|---|---|
| M1/S11 | TAP | 1/2IN | 3480 | ICRC | 4MBS | R/W |
| M1/S4 | TAP | 4MM | 3480 | ICRC | 1MBS | R/W |
| M2/S3 | DSK | FLOPPY | 3480 | ICRC | 40MEG | R/W |
| M2/S7 | DSK | OPTICAL | 3480 | ICRC | 1GB | R/W |
| . | . | . | . | . | . | . |

LIBRARY TOPOLOGY

| MODULE | NEIGHBOR MOD | MODEL | CAPACITY | # DRIVES | SPEED |
|---|---|---|---|---|---|
| M1 | M2 | 4400 | 6000 | 2 | 11SEC |
| M2 | M1 | 4400A | 4800 | 2 | 10SEC |
| . | . | . | . | . | . |

*Software personality/emulated device type.

Fig. 13

MANAGEMENT OF REMOVABLE MEDIA FOR MULTIPLE DEVICE TYPES

FIELD OF THE INVENTION

This invention relates to the management of removable media which is stored in manual library systems and/or automated library systems and, in particular, to control software that regulates media mounting in library systems that contain a plurality of different data storage media types and their associated drive elements some of which must be emulated or partitioned.

PROBLEM

It is a problem in data processing systems to provide data storage capacity that is adaptable to the varying needs of the computer system. Existing data storage subsystems are inflexible, based on a single type of media which has predetermined mechanical and electrical constraints. A computer system user must therefore purchase a mixture of data storage subsystems to match their data storage capabilities with the data stored thereon. The selection of a particular data storage subsystem also forces the user to restrict the media to a type that matches the installed data storage subsystem. The perceived cost of adding new, but incompatible data storage subsystems to an existing installation is generally prohibitive. The transition from one media to another is generally controlled by the need for changing one of the primary storage subsystem characteristics, such as performance, cost, reliability, or archival data storage capacity.

For removable media types, the effects of such transitions are exacerbated by the use of large automated library systems. An example of these automated library systems is the 4400 Automated Cartridge System, manufactured by Storage Technology Corporation, which provides economical and efficient handling of thousands of the industry standard 3480-type magnetic tape cartridge for an associated plurality of magnetic tape cartridge drive systems but requires the user to commit to a significant investment in 3480-type magnetic tape cartridges and tape drives.

In addition, for removable media types, the effect of such transitions are further exacerbated by the existence of layers of installation software that must be used to access the drives and process the data written on to the removable media. These layers of software include independent and coordinated application sets, job control language, utilities, prediction services, and media management systems. Most of this software is difficult to modify since it is written for a closed system architecture and the integration of new functionality or drive characteristics is extremely difficult except for the original vendor.

One approach to manage data storage systems is to coin esoteric names (e.g., archive tape, fast disk, etc.) for subsets of devices within the data storage system and create new device allocations to identify the appropriate device type via these esoteric names. Esoteric names can be used to direct device allocations even if some of the real devices emulate the supported device types identified by the esoteric name. However, the host computer based device allocation process for reading data previously stored on removable media is not informed of any esoteric names used to write the data on the removable media. The host computer device catalog only carries the specific device types that are supported by the system vendor (e.g., IBM 3380, IBM 3480, etc.). Even if the device catalog held the original esoteric subgroupings used to write the data on a removable media, it would be almost impossible to coordinate and synchronize catalog information among independent data storage systems provided by the same or different system vendor from the same or different site. New device support is therefore generally not accepted by a user unless it is distributed by the primary system vendor and this precludes the propagation of significant innovations if they are not directly supported by the primary system vendors. If alternative vendors can precisely duplicate the supported devices, including 100% media interchange, they can introduce their own products.

SOLUTION

These problems are solved and a technical advance achieved in the art by the removable media management system that interfaces with the host computer operating system to direct all allocation activities for removable media, whether associated with manual handling processes of an installation, with automated library systems, or with some cross installation archival systems. This system includes host system Device Allocation Control Software (DACS) to create and maintain an inventory of removable media units, including tables which relate media units identified by the volume serial ID (VOLSER) with two sets of real device characteristics. The first set of device characteristics is the characteristics that are required for proper handling of this media. An example is that compressed data on a magnetic tape cartridge requires the existence of compression logic in the device intended to read the data. A second set of device characteristics is the characteristics preferred for optimum handling of this media. An example is magnetic tape cartridges housed in an automated cartridge library are preferably mounted on a device attached to the automated cartridge library but could be directed to be removed from the automated cartridge library and mounted on a manual mount device. Another example is that cartridges containing magnetic tape with different physical characteristics, such as longer tape with thinner tape web that is more susceptible to damage, should be handled more carefully by the mechanisms in the tape path. These magnetic tape cartridges are preferably mounted on devices engineered to handle the media properly, but also be directed to be mounted on older devices that are compatible only with the format of the magnetic tape cartridge.

The removable media management system also creates and maintains tables relating real device characteristics in a hierarchical manner such that subset assignments can be deduced, i.e. if a device is able to handle n different types of media where n is greater than two, the allocation tables display this capability to a search routine. An example of this type of device is one that is able to handle media with two different types of format (e.g. 3480 standard and 3480 ICRC) and also handle media with two different types of physical characteristics (e.g. web thickness of 1 mil and 0.5 mil). This yields four different types of media. IBM 3480 and STK 4480 can only handle two of these types of media. In order to introduce the other two types of media without introducing a new device type, directive allocation must be employed with or without the presence of an automated library system.

The removable media management system also creates and maintains inventories of real device entities available to be used by the host computer systems and mapping tables relating each device address known to the host computer systems, i.e. the emulated device addresses to be related to the real device entities. This relationship can be: (1) static, one to one, or (2) dynamic, set to set, or (3) a variation or combination of static, and dynamic. The inventory of real device entities also contains a list of the important characteristics of each real device that is to be used when influencing allocation.

The removable media management system also provides a set of rules that are applied to allocation influencing which allow installation flexibility in processing removable media that is 1) local to the site, 2) received from other physical sites, or 3) received from outside enterprises. These rules include those that guide allocation on the basis of installation convention preferences (ICP's), user specific preferences (USP's), preferred device characteristics (PDC's), and application specific preferences (ASP's). An example of these rules is to make device selections algorithmetically on the basis of enterprise naming conventions or data application or user supplied parameters, i.e. creating device and media pool bounding. These conventions and parameters include, but are not restricted to: VOLSER ranges, Data Set Name ranges, Job and Job Step name ranges. One method of coordinating between the inventory of managed media and the rules is to provide a set of tags for each piece of media that are used as rules differentiators, thus allowing new rules to be developed without requiring the media inventory to be rebuilt.

A preferred embodiment of the invention is illustrated in the context of a virtual robot for a multimedia cartridge library system. This library system could be manual, automated, or a mix of manual and automated subsets. The automated library system robotically stores and retrieves a large number of media elements, such as tape cartridges, for an associated plurality of drive elements. Multiple virtual media libraries are created within the monolithic physical library system. This capability enables the use of a plurality of types of media within the monolithic physical library system with a corresponding plurality of drive elements within the library. Thus, each drive element has associated therewith a number of object storage locations within the library system which contain media of a form and content that matches the drive. The managed virtual cartridge library system maintains the correspondence between object storage location, media type and designated drive element. In addition, the managed virtual library system provides a media management capability to define media subsets, which media are consistent in mechanical and electrical characteristics, but which vary in data management attributes. This enables the user to transition to another media on an incremental basis, since a single drive can be added to the subsystem and associated media added to the library as needed without displacing the embedded base (independent of vendor) of installed media handling processes and software and equipment or requiring significant modification to these. The users can also manage the usage of the media within a specific media type by creating a plurality of subsets within a particular media class.

BRIEF DESCRIPTION OF THE DRAWING

FIG. 13 illustrates an example of a segment of an attribute table used to define media groups, drive groups and library configurations.

DETAILED DESCRIPTION OF THE DRAWINGS

The removable media management system interfaces with one or more host computers and, in particular, with the operating system resident thereon, to direct all allocation activities for removable media whether this movable media is associated with manual handling processes, with automated library systems or with some cross installation archival systems. This system includes device allocation control software to create and maintain an inventory of removable media units, including tables which relate media units identified by the volume serial identification number with particular device characteristics. The removable media device allocation is influenced by a set of rules that algorithmically guide allocation of media and devices on the basis of a plurality of variables. These variables can include media type, exterior physical dimensions of the media, data recording format used on the media, and data management characteristics of the data including user and application defined characteristics. In order to illustrate the operation of removable media management system, the invention is illustrated in the context of a virtual robot for a multimedia automated cartridge library system. This automated library system robotically stores and retrieves a large number of media elements for an associated plurality of drive elements. A manual library system can also be included in this installation but is not illustrated for the sake of simplicity of description.

Figure 1:
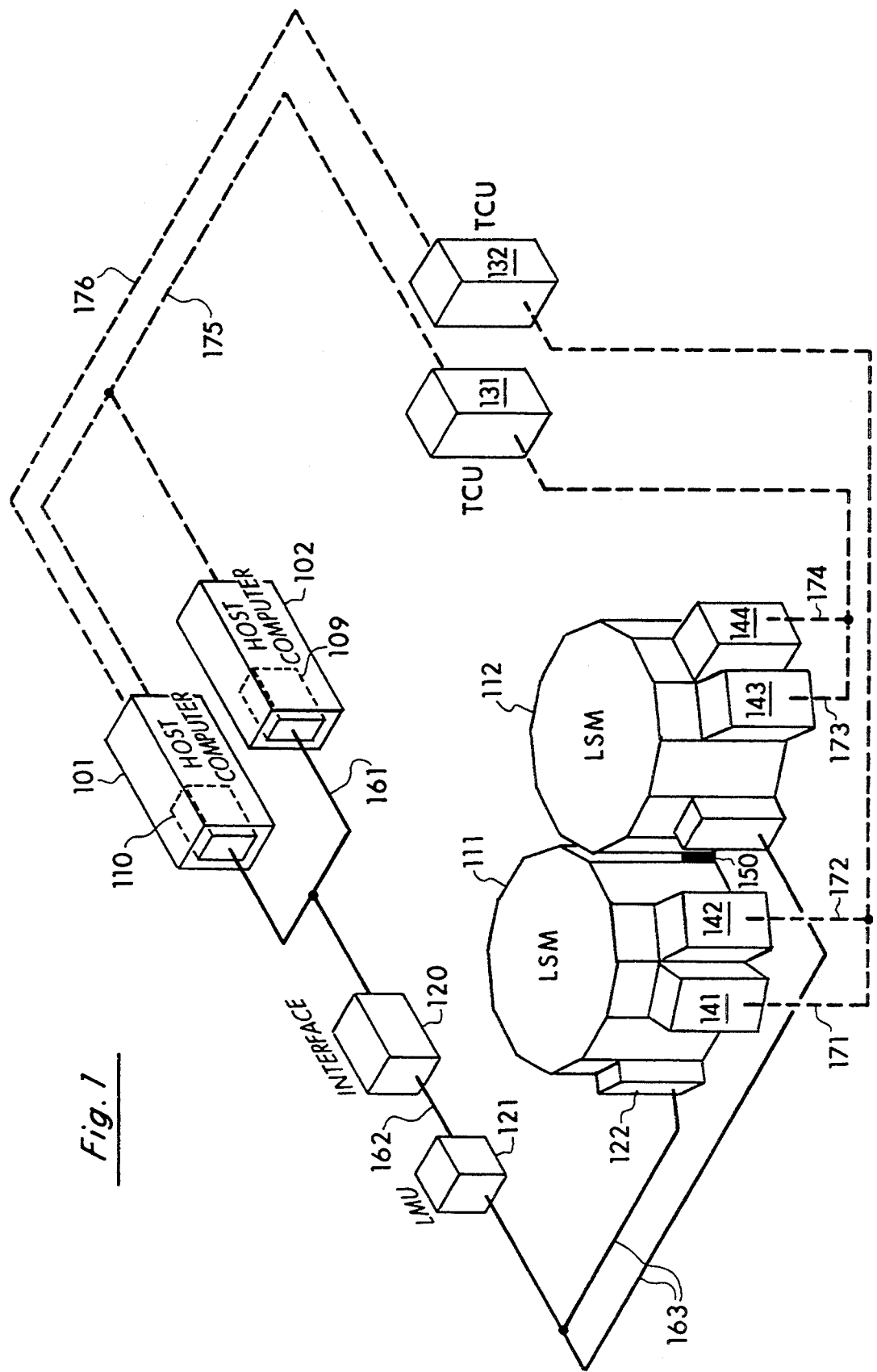
FIG. 1 illustrates the automated cartridge library system in block diagram form.

FIG. 1 illustrates in block diagram form the automated cartridge library system. A plurality of host computers 101, 102 are shown connected to the automated cartridge library system by means of two paths, a control path 161, 162 and a data path 171–176 described in more detail below. A plurality of host computers can be interconnected to a plurality of automated library systems, but only two computers and a single library system are illustrated for simplicity. The automated cartridge library system 100 consists of a plurality of elements. Among these elements are included automated cartridge library modules 111 and 112 which store media cartridges, such as 18 track magnetic tape cartridges of the IBM 3480 type, for use by host computers 101, 102. Each library module 111 stores up to 6,000 of the media cartridges and contains a robot arm system that functions to retrieve the media cartridges from cartridge storage cells contained in the library module and load the retrieved media cartridges on associated media drive systems shown in FIG. 1 as a plurality of elements 141–144 attached to library modules 111 and 112. Any type of information storage volume can be used in this type of library system and the magnetic tape cartridge type of form factor is illustrated due to the widespread use of this data storage element in the data processing industry. For the purpose of illustrating the typical operation of automated cartridge library 100, a specific example is presented wherein a single media cartridge (tape) is retrieved from its assigned storage location and mounted on an associated media drive (magnetic tape cartridge).

Library Architecture

A system of control elements 120, 121, 122, 123 is connected between host computer 101 and library modules 111 and 112. The control elements illustrated in FIG. 1 operate to control the robot arm mechanism in library modules 111 and 112. In operation, a user connected to host computer 101 requests access to a data file. This request must be translated into an identification of a particular media element which presently contains, or will store, the designated data file. For example, this data file can be stored in a designated magnetic tape cartridge, which magnetic tape cartridge is stored in, for example, library module 111. There are a number of possible methods of obtaining an identification of the specific magnetic tape cartridge which contains the requested data file.

One method of identifying a desired media element is for host computer 101 to translate the request for this data file into an operator console media mount request message. Automated cartridge library software 109, 110 resides on host computers 102, 101 respectively and functions to interface the automated cartridge library system in transparent fashion to host computer 102, 101. This is accomplished by automated cartridge library software 110 which traps operator console messages from host computer 101 and converts these console messages into media element retrieval commands that are transmitted via data link 162 to library management unit 121.

Automated cartridge library software 110 contains a data base that provides the translation between media element volume records and the media mount requests from host computer 101. Thus, a data retrieval request from host computer 101 is intercepted by automated cartridge library software 110 and is used to scan the media volume records to identify the exact physical location of the requested media element. Automated cartridge library software 110, determines the exact physical location of the requested media element in one of library modules 111 and 112 and the availability of one of drive elements 141–144 as well as the identity of the library module that contains the requested media element. Automated cartridge library software 110 then transmits control signals over path 161, via control unit 120 and data link 162 to library management unit 121 to identify the exact location of the requested media element in a identified media element storage cell and the exact location of the destination drive element.

Library management unit 121 responds to the exact physical location control signals from automated cartridge library software 110 by determining a path assignment from the identified media element storage cell to the designated drive element. For example, assume that the requested media element is located in library module 111 and the selected drive element is 144 which is attached to library module 112. Library management unit 121 designates all of the functional steps to be taken by library modules 111 and 112 to effectuate the transfer of the requested media element from library module 111 to the selected drive element 144 located on library module 112. These control signals are transmitted via control paths 163 and 164 to library control units 122 and 123 respectively. Library management unit 121 transmits control signals over control path 163 to library control unit 122 to identify the exact physical location of the requested media element. The robot arm in library module 111 is controlled by library control unit 122 which translates the control signals received from library management unit 121 into servo control signals to regulate the operation of the various servo systems (described below) of the robot arm in library module 111. Library control unit 122 causes the robot arm in library module 111 to retrieve the requested media element from the media element storage cell in library module 111.

The retrieved media element is transported by the robot arm in library module 111 to library module 112 by way of pass-through port 150 which is a device that interconnects two library modules 111,112. The pass-through port is a mechanism that enables adjacent library modules to pass retrieved media elements back and forth between the library modules for loading on a designated drive element or for returning to the media element storage array. The pass-through port mechanism 150 that interconnects library module 111 with library module 112, in response to control signals from library control unit 122, locates a transport mechanism contained therein to face the robot arm in library module 111. The robot arm in library module 111, in response to the control signals from library control unit 122, places the retrieved media element in the reserved slot in the transport mechanism of pass-through port 150. Library management unit 121, upon the completion of the media element retrieval operation by library module 111, transmits control signals on control path 163 to library control unit 122 to activate pass-through port 150 to transport the retrieved media element to face the robot arm in library module 112. Library management unit 121 then transmits control signals on control path 164 to library control unit 123 associated with library module 112. Library control unit 123 responds to these control signals by generating servo control signals to regulate the operation of the robot arm in library module 112. These control signals cause the robot arm in library module 112 to retrieve the media element placed in pass-through port 150 by the robot arm in library module 111. The media element so retrieved by the robot arm in library module 112 is then placed by the robot arm in drive element 144 as designated by library management unit 121. In this fashion, a data retrieval request from host computer 101 is translated into the identification of a designated media element, this media element is automatically retrieved from its storage location and transported to a library module that contains an available drive element. That library module then loads the retrieved media element into the drive element where it can be read by host computer 101.

The automated cartridge library system 100 contains a separate data path completely independent and isolated from the control path described above. The separate and independent data path consists of drive elements 141–144, data paths 171–174, media control unit 131–132 and data links 175–176. The retrieved media element is loaded onto drive element 144 where it is read in the usual fashion, with the data output on lead 174 to media control unit 131. The data from all the drive elements 141–144 is multiplexed together in media control unit 131–132 and transmitted over data link 175 to host computers 101 and 102. Thus, the data read from the retrieved media element is transmitted from drive element 144 through media control unit 131 to host computer 101 without the automated cartridge library system 100 being aware of the destination of the data.

Figure 2:
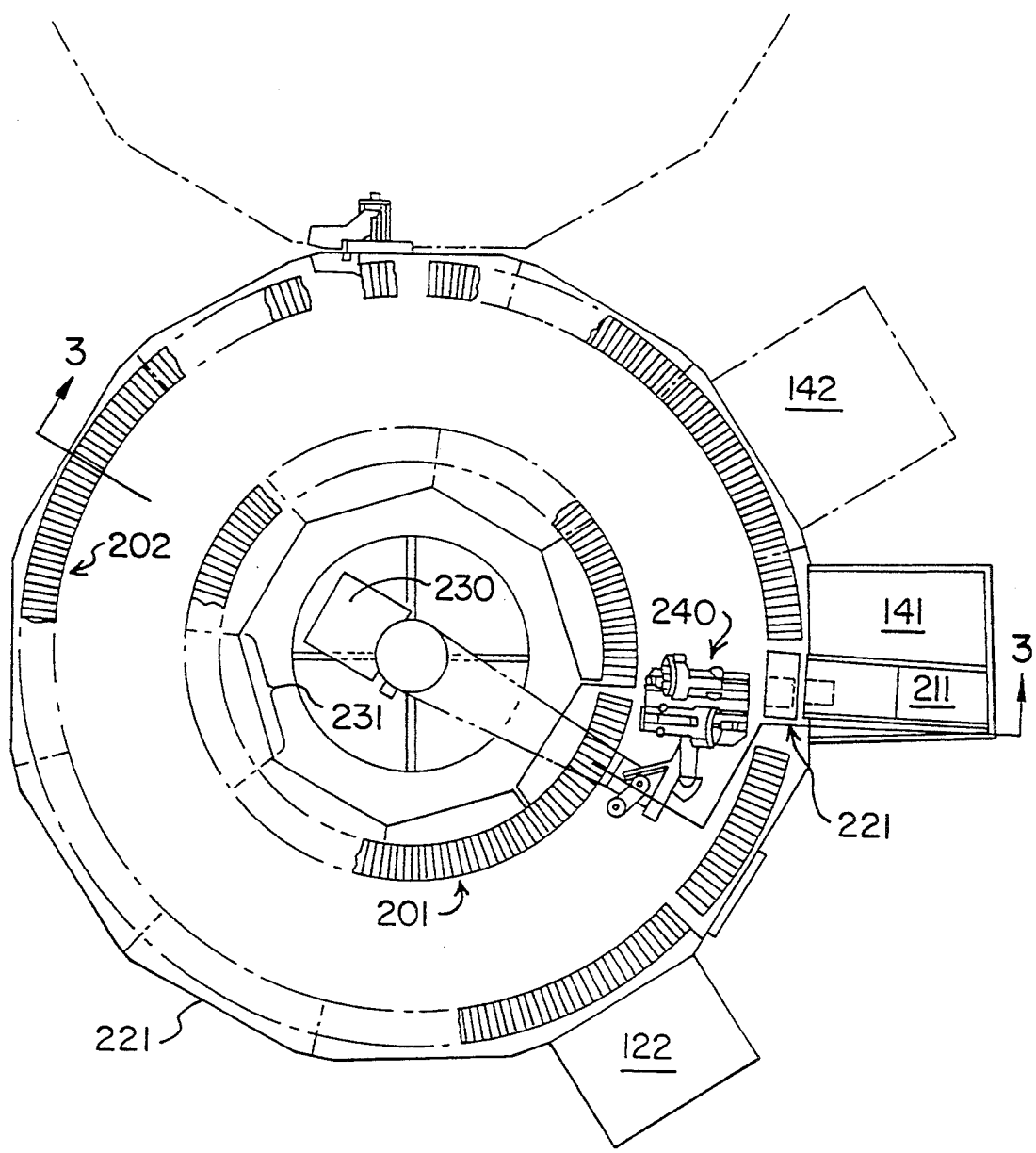
FIG. 2 illustrates a top view of a library module.
Figure 3:
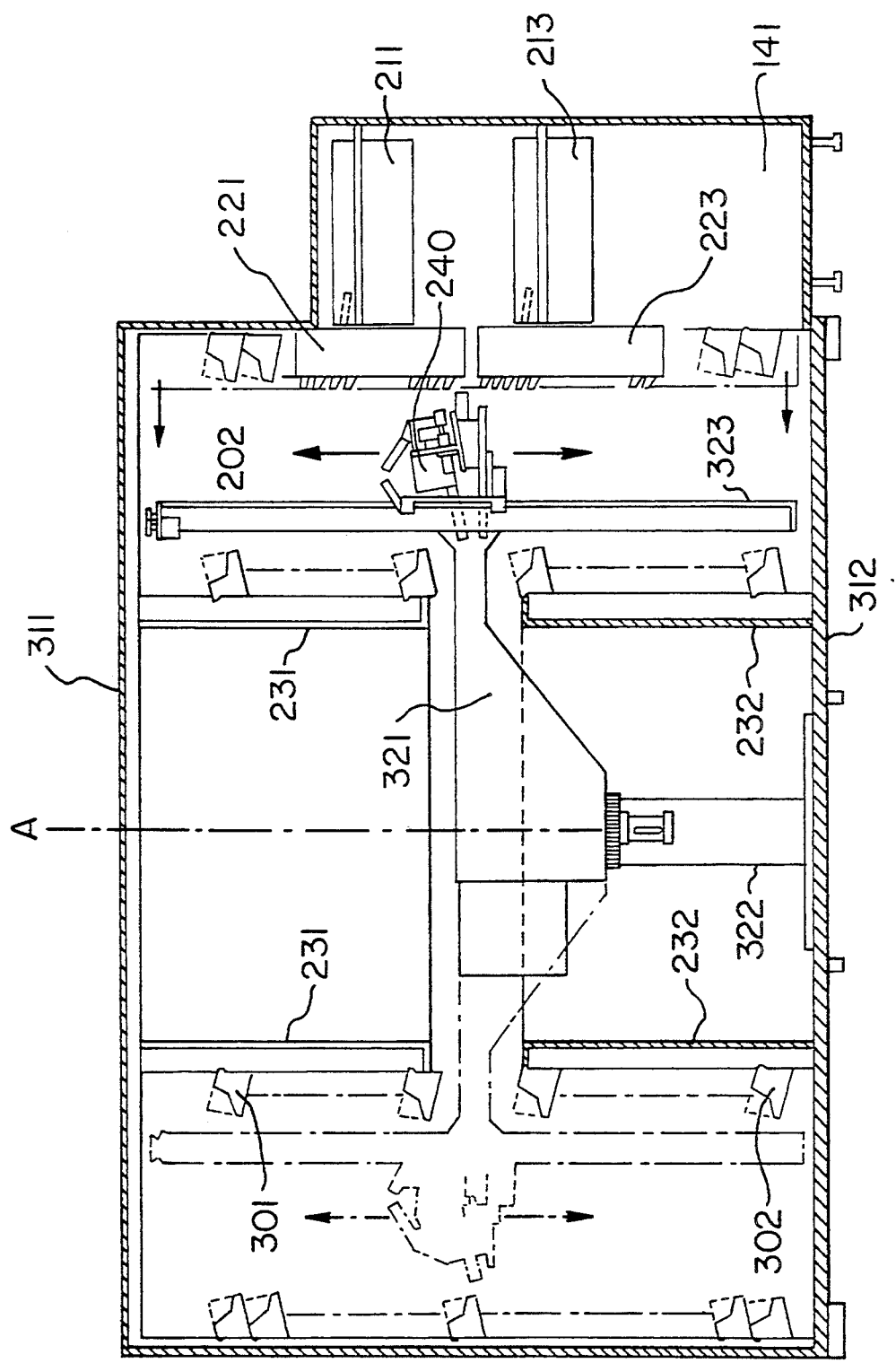
FIG. 3 illustrates a cut away view of a library module with its associated robot arm mechanism and cartridge storage cell array.

In order to more fully understand the operation of the automated cartridge library system 100, additional details of the structure of library modules 111, 112 are disclosed below, as well as the control software in automated cartridge library software 110 and library management unit 121. FIG. 2 illustrates a top view of the library module with the ceiling removed while FIG. 3 illustrates a cut away side perspective view of library module 111.

Exterior Mousing

Each library module 111 consists of a stand alone exterior housing which consists of a plurality of wall segments 221 attached to floor 312 and ceiling 311 plates and disposed about a vertical axis A. There is included an inner wall having a plurality of segments 231 forming upper portion which is suspended from a ceiling 311 of the library module 111 and another plurality of like segments 232 forming a lower portion of the interior wall which is mounted on the floor plates 312 to support a first cylindrical array 201 of media element storage cells centered about the vertical axis A. A second cylindrical array 202 of media element storage cells is concentrically arranged about the first array 201 and mounted on the wall segments 221 of the outer housing. A configuration of the segments 221 of the outer wall housing are such that the resulting structure is in the shape of a dodecahedron. The twelve-sided arrangement of the library module provides great flexibility in configuring both the drive elements as well as configuring a plurality of library modules in a juxtaposed arrangement.

One of exterior wall segments 221 and its associated media element storage cells is hinged to provide an access door for entry into the library module. This access door is provided for maintenance access to the robot arm and also to permit an operator to retrieve and load media elements into the drive elements in the event of a failure of the library module.

Media Cartridge Storage Cells

Figure 5:
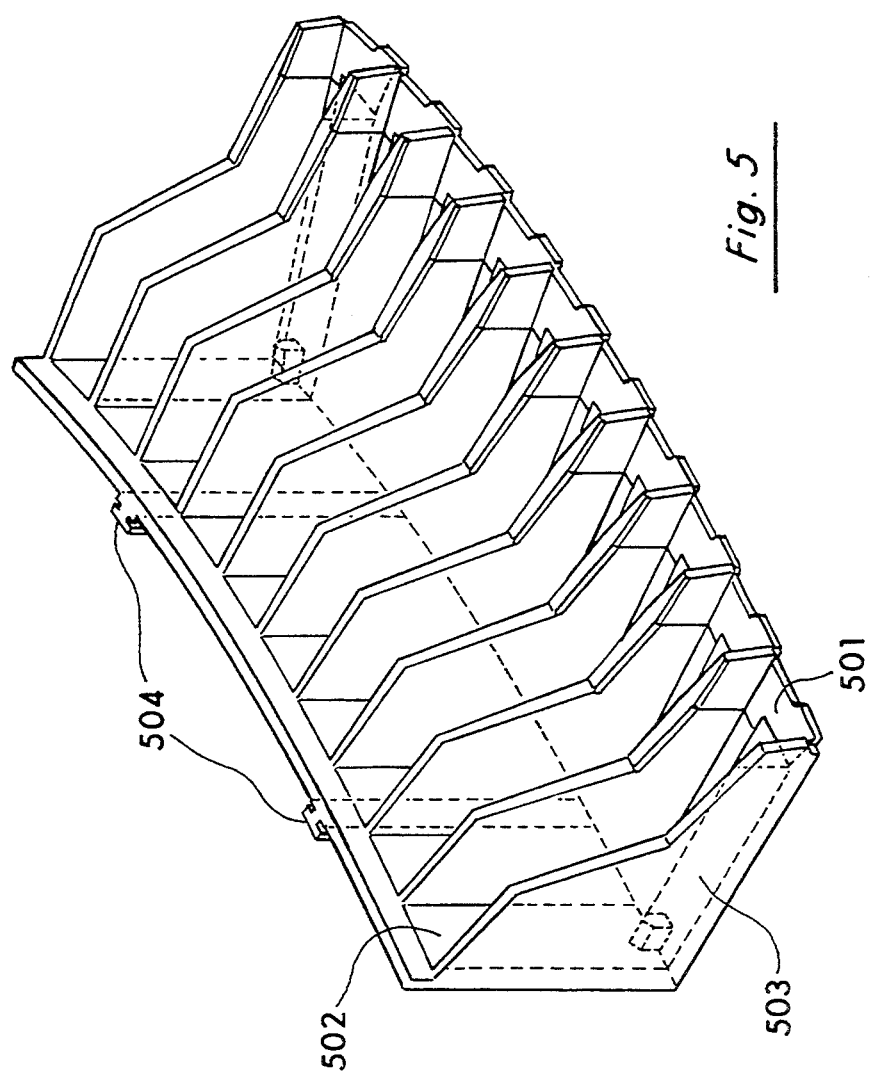
FIG. 5 illustrates a perspective view of the cartridge storage cells.

Library module 111 contains two concentrically arranged cylindrical arrays of media element storage cells 201, 202. FIG. 5 illustrates in additional detail the arrangement of a particular array of media element storage cells. The array of media element storage cells illustrated in FIG. 5 has a radius of curvature adapted to mounted in the inner cylindrical array 201 of media element storage cells of library module 111. The media element storage cells on the outer cylindrical array 202 are formed with an opposite curvature so that all of the media element storage cells in the inner 201 and outer 202 cylindrical arrays face each other so that the robot arm 230 can retrieve media elements from either the inner 201 or the outer 202 cylindrical array. The media element storage cells illustrated in FIG. 5 consist of a bottom portion 501, a back portion 502 with intervening wall segments 503 to provide a plurality of slots or cells for the storage of the media elements. Bottom portion 501 of the media element storage cells is angled downward, front to back, so that a media element placed in the media element storage cell tends to slide along bottom portion 501 into the media element storage cell. The wall segments 503 are adapted for access by the hand and finger assemblies 240 of the robot arm 230. In addition, attachment apparatus such as hooks 504 formed at the rear of the array of media element storage cells can be used to suspend the media element storage cells from the wall segments of library module 111.

The arrangement of media element storage cells is illustrated more clearly in FIG. 3 wherein the outer cylindrical array 202 is illustrated along the periphery of library module 111. The inner cylindrical array of media element storage cells 201 is illustrated in FIG. 3 as comprising two individual segments. A first segment 302 of the inner cylindrical array is arranged as standing on the floor 312 of library module 111. A second segment 301 of the inner cylindrical array 201 is illustrated in FIG. 3 as suspended from the ceiling 311 of the library module 111. In this fashion, an aperture is provided between the upper 301 and lower 302 segments of the inner cylindrical array 201 so that robot arm 230 can rotate about the center pivot axis "A" without interfering with any of the media element storage cells in the inner cylindrical array 201.

Robot Arm Mechanism

Figure 4:
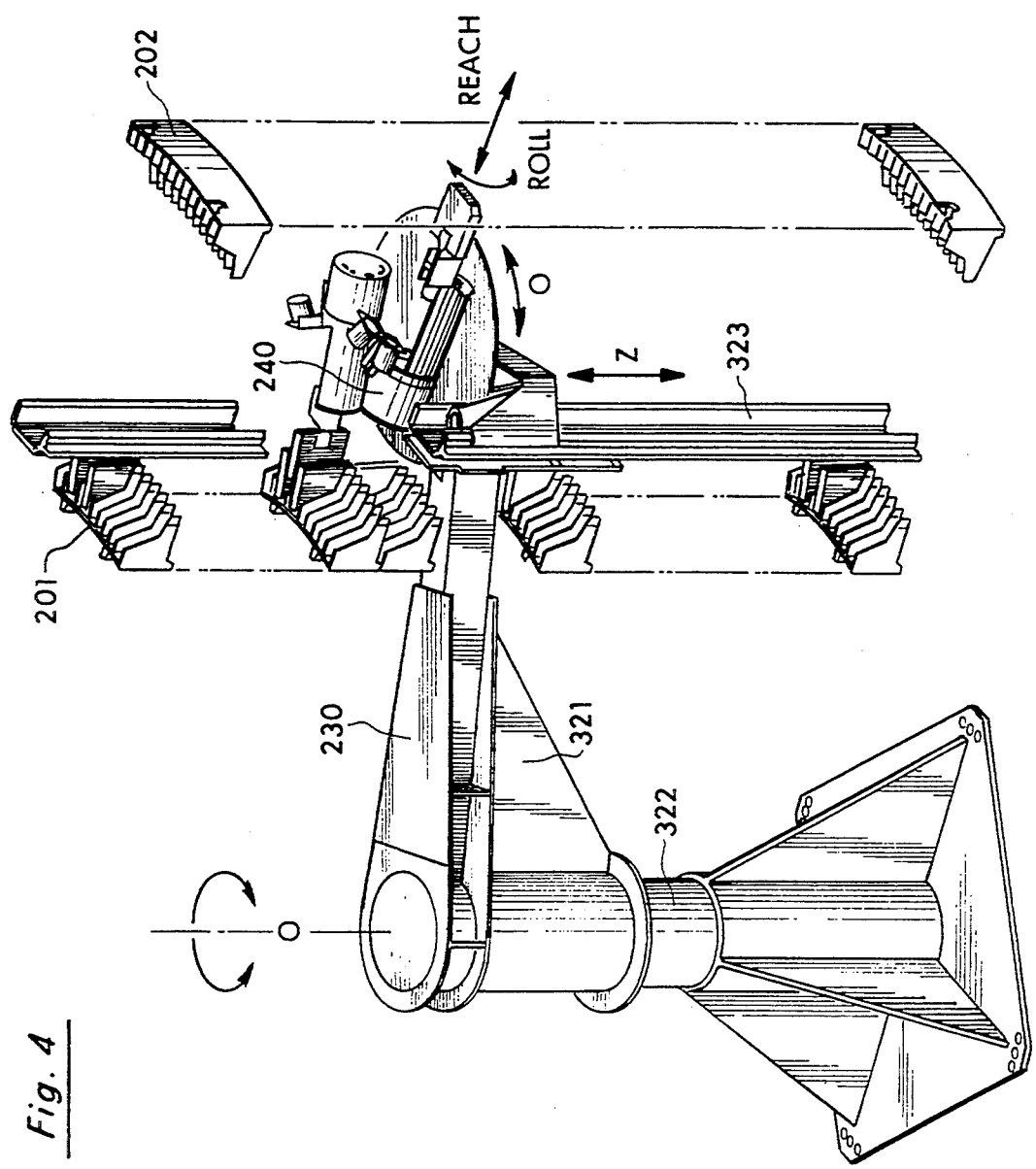
FIG. 4 illustrates a perspective view of the robot arm mechanism.

FIGS. 2, 3 and 4 illustrate a top view, side view and perspective view respectively of the robot arm assembly 230 of library module 111. The robot arm assembly 230 consists of a plurality of mechanisms all operating in conjunction to provide a movable arm for retrieving media elements from their individual storage cells. The robot arm is described in detail in U.S. Pat. No. 4,864,511. The robot arm is discussed herein to illustrate the operation of this embodiment of the invention. The robot arm 230 consists of an arm assembly including a theta arm 321 rotatably mounted on a support column 322 which is attached to the floor plates 312 of library module 111. The arm assembly includes a Z mechanism 323 attached to the end of theta arm 321 remote from the support column 322. The Z mechanism 323 has coupled thereto a wrist, roll and finger assemblies 240 which perform the actual media element retrieval from the storage cell function. The Z mechanism 323 provides a vertical range of motion for the wrist, roll and finger assemblies 240 to access various levels of the media element storage cell array. The theta arm 321 locates the Z mechanism 323 and its associated wrist, roll and finger assemblies 240 in the proper location to access both the inner 201 and outer 202 cylindrical arrays of media element storage cells. The robot arm support column 322 includes a motor which causes the theta arm 321 of the robot arm 230 to rotate about the pivotal point "A" of the robot arm 230 so that the robot arm 230 can access all of the media element storage cells in the circular array about the pivot point A. Thus, the elements in the robot arm assembly 230 cooperatively operate to access each and every storage cell in the entire library module 111. The servo motors controlling each of the various ranges of motion associated with elements in the robot arm assembly 230 are all controlled by control unit 122 connected to library module 111. Suffice it to say that the robot arm assembly 230 is operational to retrieve a media element from any of the approximately 6,000 media element storage cells in library module 111.

Vision System

Figure 11:
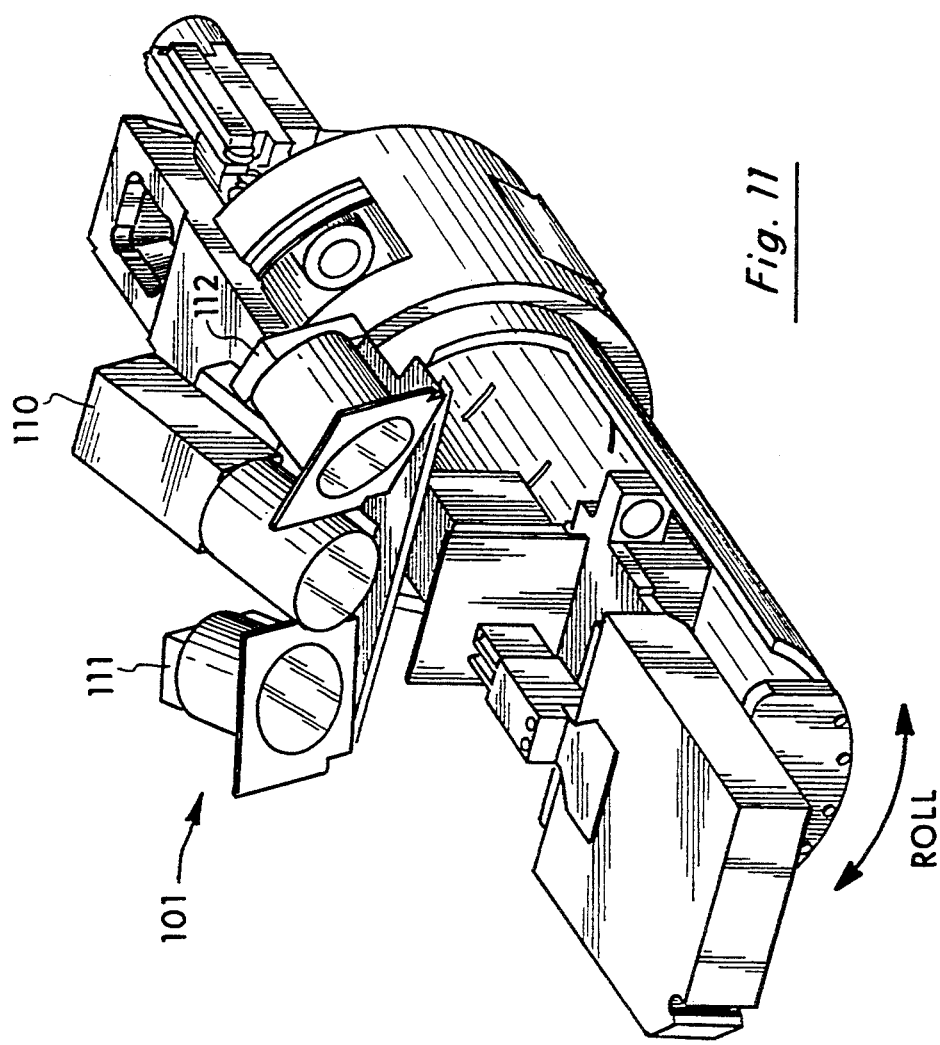
FIG. 11 is a perspective view of the vision system and its source of illumination which are positioned at the end of the robot arm.

A vision system 1201 located on the wrist (roll) assembly is illustrated in FIG. 11. Vision system 1201 is located on the top of the wrist assembly and is focused on a rectangular-shaped area a predetermined distance in front of the finger assembly when the finger assembly is fully retracted. The point of focus of vision element 1210 coincides with the position of a machine-readable label imprinted on the end of the media element stored in a media element storage cell. This focus is such that the vision element can read both the label imprinted on the end of the media element that is stored in the media element storage cell as well as a positioning target associated with the media element storage cell.

In order to enable vision element 1210 to read the label on the media element, a source of illumination is provided. The source of illumination consists of pair of lamps 1211, 1212 arranged one on either side of vision element 1210, and aligned in substantially the same orientation as vision element 1210. Lamps 1211 and 1212 are directed so that the light beams emanating from these two lamps illuminate a rectangular-shaped area in the line of sight of vision element 1210, which area coincides with the position of the label on the end of the media element. Thus, the illumination provided by the two lamps 1211 and 1212 is evenly distributed across the label on the media element so that vision element 1210 can accurately read the machine readable characters imprinted on the label.

Machine-Readable Label

Figure 12:
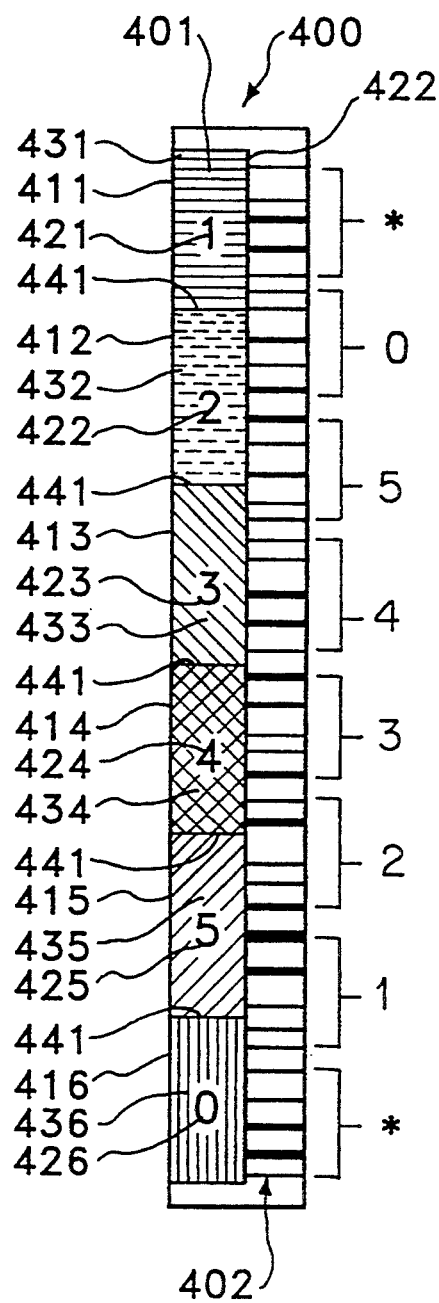
FIG. 12 illustrates a typical label format that can be used in this system.

FIG. 12 illustrates a typical label 400 that can be used on the media elements in the automated element library system. The label 400 incorporates a machine readable and human readable coding system. The first vertical column 401 of characters imprinted on the label 400 is divided into a series of vertically aligned, rectangular segments 411-416 each of which are separated from a contiguous other by a printing trap comprising a solid line 441. The rectangular segments are also separated from a second vertically aligned column 402 of characters adjacent to and coextensive with the first vertical column 401 of characters by another printing trap 442 comprising a solid line. One character 421-426 of a machine-readable and human-readable code is located within each rectangular segment 411-416 in the first column 401 of characters thereby forming a message in a first code. The second vertical column 402 contains a single rectangular segment containing a string of characters in a machine-readable code such as a bar code. This string of characters in the second vertical column 402 comprises a message in a second code which is identical to the message formed in the first vertical column 401 in the machine-readable and human-readable code. In addition, the background 431-436 of each of the rectangular segments 411-416 contained within the first vertical column 401 are suitably color coded to correspond to the respective characters 421-426 of machine-readable and human-readable code contained therein, thereby providing a message in a third code which is identical to the above-described messages of the first and second codes. The two vertical columns 401, 402 of characters imprinted with the first and second codes are so arranged for redundancy purposes. The message (1, 2, 3, 4, 5, 0) in the first vertical column 401 are printed to be read downwardly from top to bottom while the bar code (*, 1, 2, 3, 4, 5, 0, *) in the second vertical column 402 is printed to be machine readable upwardly in the reverse direction. In this manner, the label 400 may be used to accurately identify a media element in spite of the absence of a portion of the label 400. For example, if the bottom segment of the label 400 were missing, the vision system 1201 would be able to read the first portion of the first code and the last portion of the second code. By combining these two readable segments of the first and second codes, the complete code on the label 400 can therefore be reconstructed by the vision system 1201.

It is obvious from this configuration of the label 400, that proper illumination is required for the vision system 1201 to be able to distinguish the machine readable bar code characters imprinted thereon. In the particular application discussed above, a pass scanning arrangement is used. The entire label 400 is illuminated by the source of illumination 1211, 1212 associated with the vision system while the illuminated image is focused on an array of photo detectors, such as a charge coupled device (CCD) that comprises the vision element 1210. The image of the dark bars of the bar code will fall on some of these photo detectors while the light spaces will fall on other of the detectors. An electrical signal is applied to the charge coupled device array of photo detectors 1210 and the light value at each photo detector is sequentially read out. Thus, the signal from the charge coupled device array can be processed and decoded in the same way as the signals produced in an active scanning system. An RS-170 type of signal is thereby obtained as the output of the vision system 1201. It is imperative, however, that sufficient balanced light be applied to the entire label so that the charge coupled device photo detectors will respond to the variation in dark and light areas caused by the presence of the bar code characters.

Drive Elements

The media elements retrieved from the individual media element storage cells are typically loaded onto a drive element (ex tape drive 211) so that the data contained on the media element can be read by host computer 101. FIG. 2 illustrates the placement of two drive elements units 141, 142 on library module 111. The drive elements units are shown attached to two of the twelve outside walls of library module 111. Within each drive element unit (ex 141) is located a plurality of individual drive elements 211-214 which function to read data from the media elements therein. FIG. 2 illustrates a single tape drive (211) located in the drive element unit 141 to illustrate the orientation of tape drive 211 and drive element unit 141 with respect to the robot arm 230 and the cylindrical array of media element storage cells. In particular, a segment of the media element storage cells is removed from outer cylindrical array 202 to provide an aperture through which the front loading door opening of tape drive 211 protrudes a sufficient distance so as to be lined up with the surrounding storage cell arrays. The robot arm 230 can thereby load a media element into the tape drive with the same or similar range of motion as the replacement of a media element into one of the individual storage cells in the media element storage cell arrays. A side view of drive element unit 141 is shown in FIG. 3 wherein four of the drive elements 211-214 are shown stacked one above the other in a vertical alignment within drive element unit 141 illustrated in FIG. 2. As can be seen from FIGS. 2 and 3 the orientation of the drive elements 211-214 is such that a media element is placed into the media drive (ex tape drive 211) on an angle similar to that of the individual media element storage cells with the difference being that the tape drive 211 requires a horizontal loading of the media element while the media element storage cells store the media elements in a vertical alignment. Thus the robot arm 230 in retrieving a media element from an individual media element storage cell and loading it into a drive element unit 141 must rotate the media element through a 90 degree angle for proper orientation for loading into the tape drive 211.

Multi-Module Architecture

Figure 6:
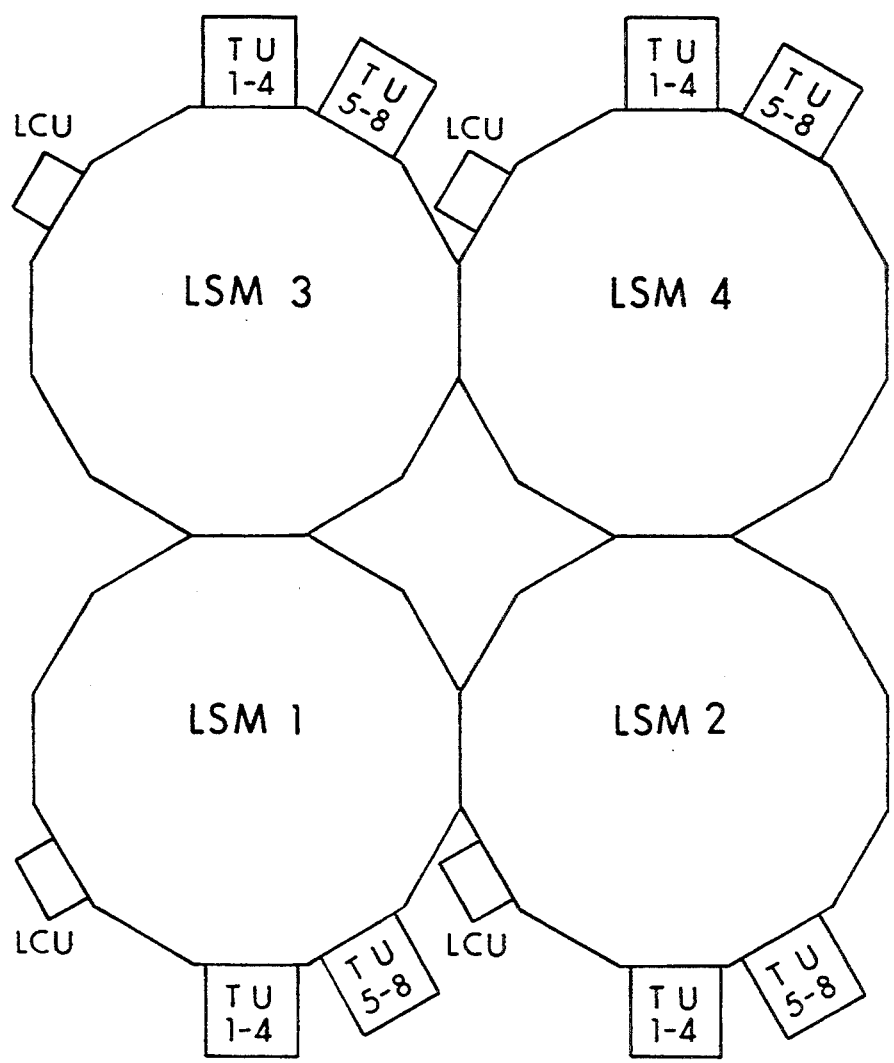
FIGS. 6 and 7 illustrate two multi-module configurations of the automated cartridge library system.
Figure 7:
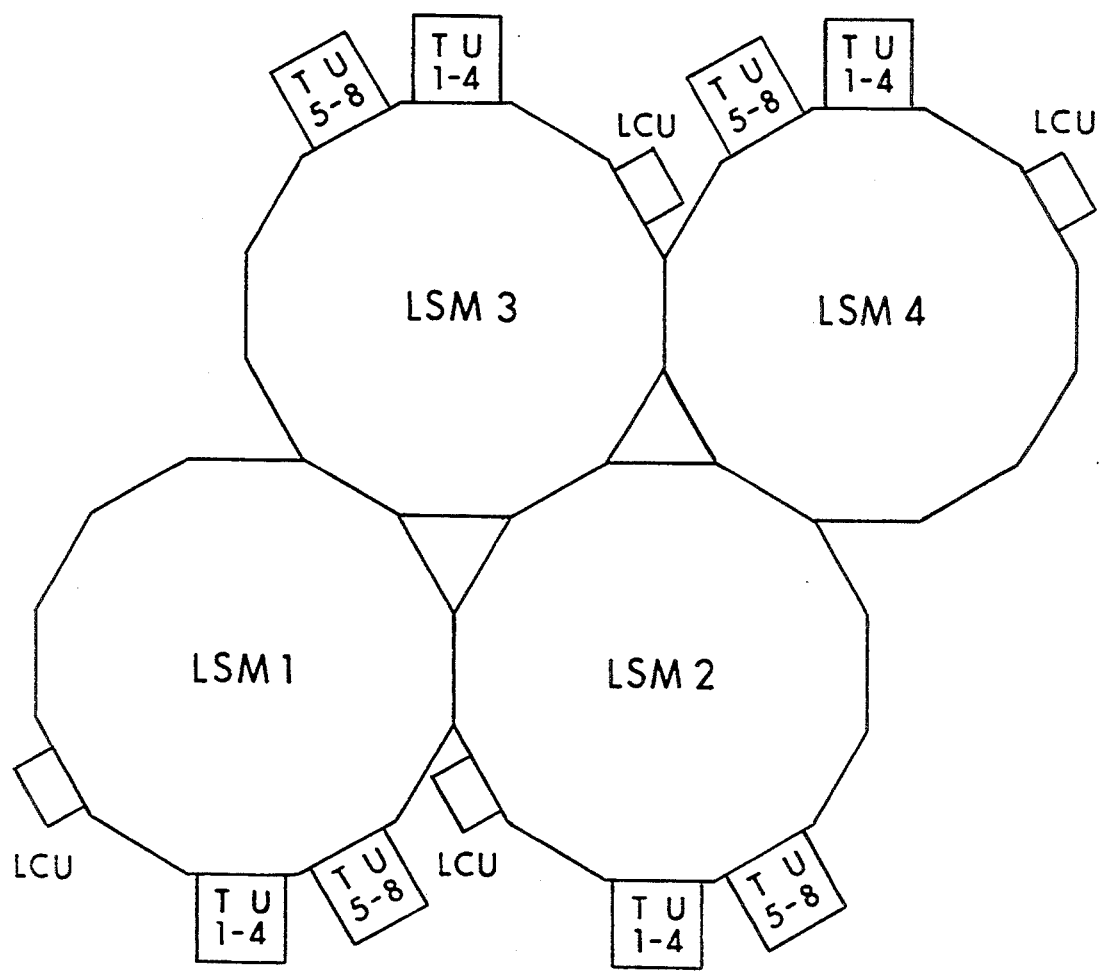

FIGS. 6 and 7 illustrate two of the plurality of ways of interconnecting four library modules. As it can be seen from these two figures, the four library modules can be connected as a rectangular shaped array or in a parallelogram shaped array. It is, also possible to connect these four modules in a straight-line I formation, in the shape of a T, in the shape of a J, in an L shape, in an S shape, in a star configuration or other variations thereof. The use of twelve sides provides the capability to interconnect adjacent library modules at 30 degree increments, with the only limitation being that one of the twelve sides of the library module must be reserved for connection to the control unit and another side of the library module must be reserved for an access door through which an operator can access the robot arm mechanism for maintenance purposes. Aside from this limitation, the library modules can be connected in any configuration desired by the user. Automated cartridge library software 110 can manage up to 256 library management units 121 and each library management unit 121 can handle up to 16 library modules 111. Therefore, one automated cartridge library software 110 can manage 4096 library modules 111, with each library module 111 capable of handling approximately 6,000 cartridges. Thus, an entire automated cartridge library system can process over 24½ million 18 track magnetic tape cartridges, with each 18 track magnetic tape cartridge having a data storage capacity of approximately 200 megabytes. Thus with the number of library modules that can be interconnected and the alignment possibilities provided by the 30 degree incremental orientation of the library modules, a large number of configuration possibilities exist.

Pass-Through Port Mechanism

Figure 8:
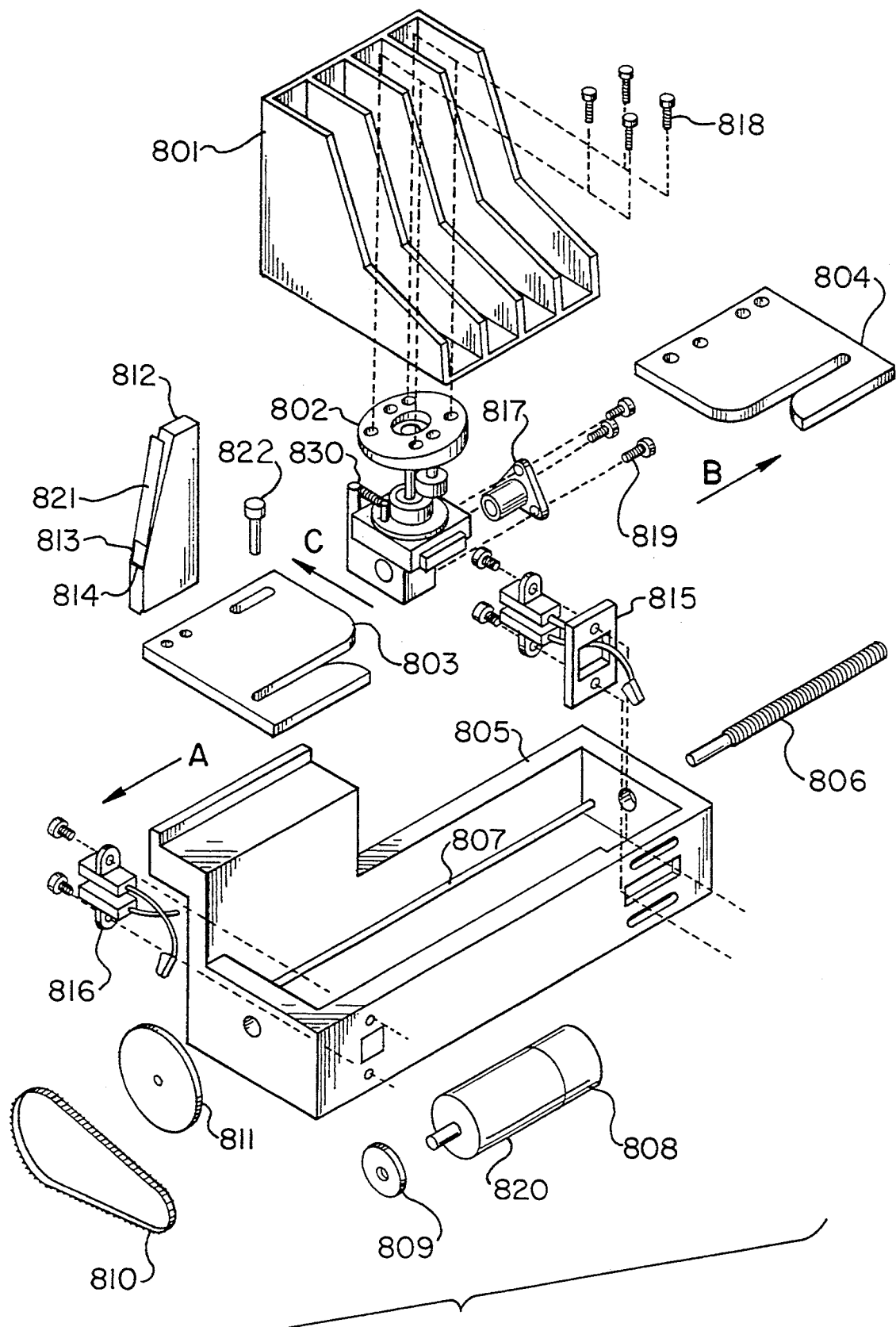
FIGS. 8 and 9 illustrate the pass through port mechanism.
Figure 9:
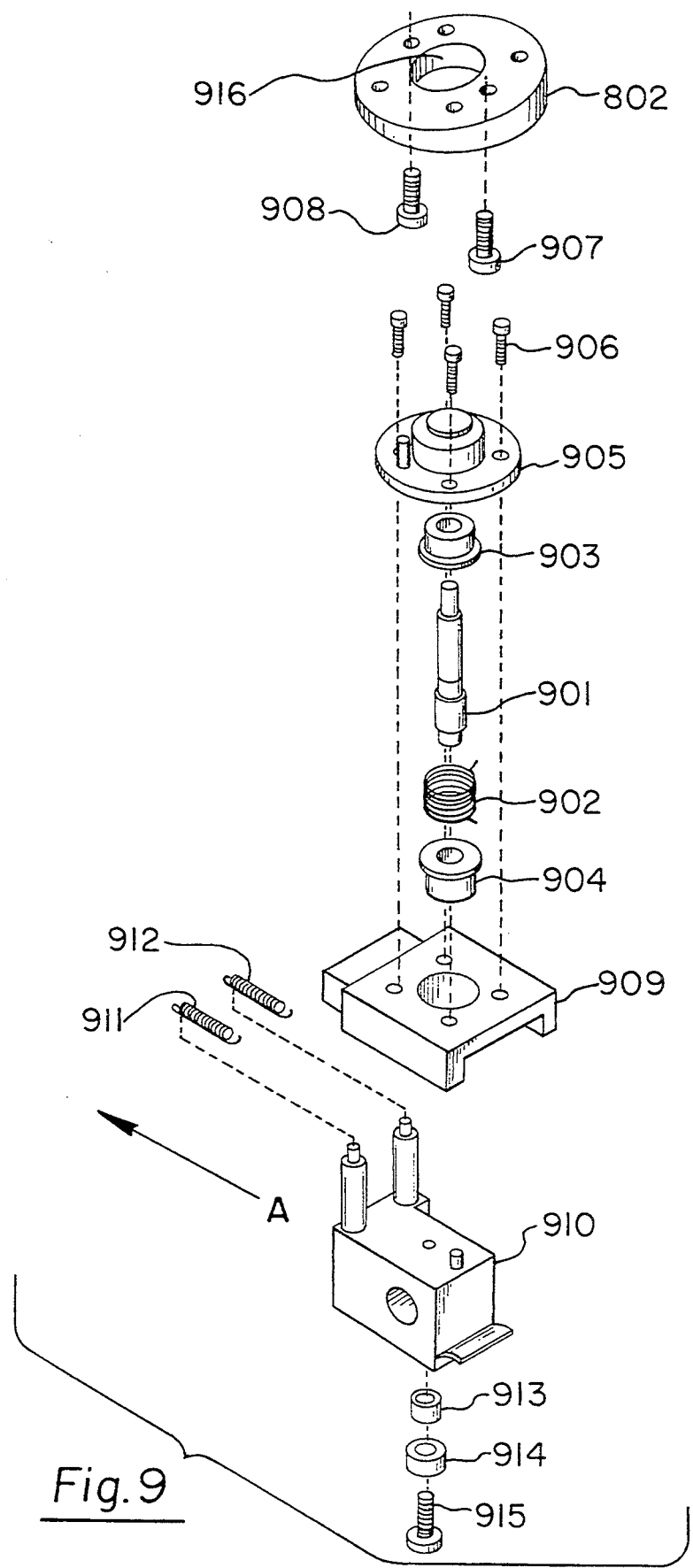

The method of interconnecting the library modules in juxtaposed position so that the robot arm contained in a library module can operate cooperatively with the robot arms in adjoining library modules is the pass-through port mechanism 150 disclosed in more detail in FIGS. 8 and 9. It is apparent that the task of interconnecting library modules is a non-trivial one since there are numerous misalignments that can take place between adjacent juxtaposed library modules 111, 112. The vertical alignment as well as horizontal alignment discrepancies between modules can cause simple yet disturbing module interconnection difficulties. In addition, any angular displacement about the three axes can cause serious misalignment problems so that the use of a robot arm to pass a media element from one library module to another can be frustrated by any of the above-described misalignments individually or in combination.

The solution to this perplexing problem is the use of a pass-through port 150 which automatically aligns the media element received from one robot arm in a library module to the orientation and alignment required of a robot arm in the adjoining juxtaposed library module. The pass-through port 150 consists of a set of transport storage cells 801 into which a robot arm places media elements, which transport storage cells 801 are configured in similar fashion to the media element storage cells in the inner and outer cylindrical arrays. The mechanism to which this set of transport storage cells 801 is connected performs a number of functions. The mechanism transfers the orientation of the transport storage cells 801 from facing a first robot in a first library module to a 180 degree rotation to face the robot arm in the adjoining library module. This rotation is accomplished as the transport storage cells 801 are moved horizontally through adjoining openings in the walls of the adjoining library modules. The mechanism that provides this horizontal transport function also provides a self-aligning arrangement which translates the transport storage cells 801 through lateral, angular and horizontal distance alignment orientations so that the transport storage cells 801 exactly align with the media element storage cell arrays in the destination library module. The location of the pass-through port access holes at each library module are precisely placed so that the end points of the pass-through port mechanism 150 are precisely defined with respect to the axis of the robot arm of the adjoining library modules. It is the intermediary apparatus that connects these apertures in the adjoining library modules that provides the alignment function for the transport storage cells 801 as they traverse the distance from one library module to adjoining library module. This functionality enables a plurality of library modules to be interconnected so that these media elements can be efficiently and expeditiously passed from one library module to another.

The pass through port mechanism is illustrated in further detail in FIGS. 8 and 9. Pass through port 150 consists of frame 805 which is connected at one end to library module 111. Frame 805 includes lead screw 806 and guide shaft 807 on which carriage mechanism 830 rides. An electric motor 820 has an attached gear 809 which, by means of belt 810 drives gear 811 to turn lead shaft 806. In conventional fashion, when lead shaft 806 rotates the carriage mechanism 830 translates along the longitudinal length of frame 805 while riding on guide shaft 807 which also prevents the carriage mechanism 830 from rotating due to the movement of lead screw 806. Carriage mechanism 830 is shown in further detail in FIG. 9 and as shown in FIG. 8 supports an array of transport storage cells 801. Transport storage cells 801 are a segment of the standard media cartridge storage cells used in the storage arrays of the automated library module 111. A pair of cams 803, 804 are also connected by means of screws 822 to frame 805. The cams 804 are shaped so that the carriage mechanism 830, as it traverses the length of frame 805 encounters the surface of cams 803 and 804. The carriage mechanism 830 is a spring loaded mechanism which follows the surface of cams 803 and 804 to rotate the transport storage cells 801 through a full 180 degree rotation. In particular, when the carriage mechanism 830 is to the far forward of frame 805, which end is indicated by the arrow A, the transport storage cells 801 face their open ends in direction A. The angular arrangement of the notch in the cam 803 is such that the transport storage cells 801 point directly to the center axis A of the robot arm mechanism as illustrated in FIGS. 2, 3, and 4. As electric motor 820 drives gears 809 and 811, turning lead screw 806 which causes carriage mechanism 830 to traverse the length of frame 805 until it reaches the far end of frame 805. As it approaches the far end of frame 805, which end is termed the slave end of the pass through port, carriage mechanism 830 encounters cam 804 which serves to rotate transport storage cells 801 through 180 degree rotation so that the open end of transport storage cells 801 faces the center axis A of the robot arm mechanism of the library module 112 to which the pass through port 150 is connected. The rotational operation of this mechanism may be further understood by viewing FIG. 9 which is an exploded detail of the transport mechanism 830. The transport mechanism 830 consists of a center pivot shaft 901 around which is wound torsion spring 902. Washers 903 and 904 maintain the bottom end of torsion spring 902 in a fixed relation to frame 909 and allows the top end of torsion spring 902 to rotate about pivot shaft 901. The rotation of the torsion spring around pivot shaft 901 causes plates 802 and 905 to rotate. The torsion spring 902 is biased in a fashion so that transport storage cell 801 faces in the direction illustrated in FIG. 8 that is perpendicular to the movement of the carriage mechanism 830 along the length of frame 805. Thus, until carriage mechanism 830 comes in contact with either cam 803 or 804, the transport mechanism 830 faces transport storage cells 801 in the direction shown in FIG. 8. To compensate for any horizontal or lateral misalignments between adjacent library modules, transport carriage 830 is equipped with a pair of guide rollers 907 and 908 which follow the contours of cams 803 and 804. In addition, a slide mechanism 909 is provided to provide a range of motion perpendicular to the direction of travel of transport carriage 830, in direction C. This is accomplished by a pair of springs 911 and 912 attached to posts on housing 910 biasing slide mechanism 909 in the direction C illustrated in FIG. 8. As transport carriage 830 traverses the length of frame 805, guide rollers 907 and 908 come into contact with either cam 803 or 804 and the surfaces of cams 803 and 804 rotate transport storage cells 801 in either direction A or B as well as laterally displacing slide mechanism 909 to account for lateral misalignments of the adjacent library modules. The position of transport carriage 830 at either end of frame 805 is detected by means of a sensor mechanism which consists of Flag 817 attached to the transport carriage 830 with a pair of sensors 815 and 816 located at either end of frame 805. Thus, when transport carriage 830 is an either end position along frame 805, flag 917 will make contact with either sensor 815 or 816 to indicate at which end of the pass through port the transport carriage 830 and transport storage cells 801 are located. In addition, a shaft encoder 808 attached to electric motor 820 counts the revolutions of the motor. The shaft encoder 808 provides a digital output to indicate how many revolutions have taken place in electric motor 820 thereby indicating the position of transport carriage 830. Pass through port 150 is also equipped with a positioning target 812 which consists of a housing that has a horizontal target 814 and a vertical target 813 attached to the front thereof for positioning alignment by the vision system of the robot arm. In addition, a label area 821 is provided so that pass through port 150 can be identified by use of a label readable by the vision system of the robot arm. One of these targets exists at either end of the pass through port and is connected to cam 803 and 804 respectively to indicate the position of transport storage cells 801 since cam 803 and 804 accurately position transport storage cells 801 with respect to targets 813 and 814 irrespective of the alignment of the adjacent library modules.

Automated Cartridge Library Multimedia Structure

The above-described automated cartridge library 100 can serve a plurality of drive elements 141-144 of diverse types, and can also store and retrieve media elements which are of differing mechanical and recording formats. Thus, there are a plurality of data storage media elements which differ in external physical dimensions (form factor), physical architecture (dual reel coaxial cartridge, dual reel coplanar cassette, single reel cartridge, etc.), media physical types (magnetic tape, magnetic disk, optical disk, solid state memory, etc.), and which vary in physical characteristics within physical type ($\frac{1}{2}$ inch tape, 4 mm tape, etc.), and which can also vary in data recording format (ICRC, non-ICRC, etc.), data management attributes (scratch, read only, write only, write once, etc.). A difficulty with existing library systems is the need to select a rigidly defined subset of these attributes which are then applicable uniformly to all the data storage elements in the library. The drive elements, media elements and robot characteristics are limited by this need for total homogeneity within the library system.

The automated cartridge library 100 incorporates the concept of a "virtual robot" to enable the automated cartridge library 100 to appear to the computer system 101 as a plurality of automated cartridge libraries, each storing and retrieving a class of media elements for a set of corresponding media drives. This permits the automated cartridge library 100 to be dynamically partitioned among the various media types to reflect both the present population of media stored within the library and the media drives connected to the library. This partitioning is transparent to the computer system 101 and can transcend physical boundaries within the automated cartridge library 100. In fact, the automated cartridge library 100 can operate in conjunction with manually operated library shelves and other automated library systems all under control of the removable media management system.

Attribute Mapping Tables

This partitioning is reflected in the attribute mapping table, an example of a segment of which is illustrated in FIG. 13. Different operating systems require different parameters of varying formats. This table divides the data storage universe of the automated cartridge library 100 into a multidimensional space, with each dimension, or surface through several dimensions, representing a partition of the media element storage locations and drive elements based upon a defined criteria. For example, the mapping table partitions the automated cartridge library 100 into the categories: Library Topology, Volume Attributes, and Drive Attributes. The library topology represents a definition of the number of library modules 111, 112 in the automated cartridge library 100, their configuration, interconnection and physical properties. Thus, the library modules 111, 112 may not be identical throughout the library and can be interconnected mechanically by the pass through port 150 or electronically by a data link which interconnects a corresponding media drive on each of the interconnected library modules. An example of this electronic interconnection is the remote archival or dual copy backup library which receives data over the data link indicative of the data file presently being written on the media by the computer system 101 or data read from a selected media to the remote module for archival purposes.

The drive attributes category in the mapping table indicates the physical location of the drive element within the automated cartridge library 100 and defines the data storage image of the drive element. This data storage image includes a definition of the type of media handled by the drive element (disk, tape, etc.) as well as any subtype specifics of the media type (½ inch tape, 4 mm tape, etc.). Furthermore, the software personality/emulated device type and recording capability (ICRC, etc.) are defined. There is also a category of drive element physical architecture specifics (SPEC) that influence the selection of a drive element by the library (model type, age of drive, fault history, data transfer rate, etc.). Furthermore, a layer of managerial attributes are defined to indicate data management limitations (read only, write only, etc.) for this specific drive element.

The volume attributes entries in the mapping table define the media element in a manner that corresponds to the drive element attributes. These include the physical location of the media element within the library and a definition of the data storage image of the media element. This data storage image includes a definition of the type of media (disk, tape, etc.) as well as any subset specifics of the media type (½ inch tape, 4 mm tape, etc.) and recording capability (ICRC, etc.). There is also a category of media element physical architecture specifics that influence the selection of a drive element by the library (form factor, data storage capacity, etc.). Furthermore, a layer of managerial attributes are defined to indicate data management limitations (read only, write only, etc.) for this specific media element.

It is obvious that each of these classifications, attributes, subsets can be viewed as another dimension in the multidimensional space of the automated cartridge library 100. The user's request for a data file must then be mapped by the removable media management system into a selection of the optimum media element (for writing the data file) or a selected media element (for read data file operations) located in the automated cartridge library 100 and a corresponding drive element on which the robot mechanism of the automated cartridge library 100 mounts the identified media element. In operation, the automated cartridge library 100 executes the steps illustrated in flow diagram form in FIG. 14. In order to better understand this process, the software architecture of this system is first described.

Automated Cartridge Library Software Architecture

Figure 10:
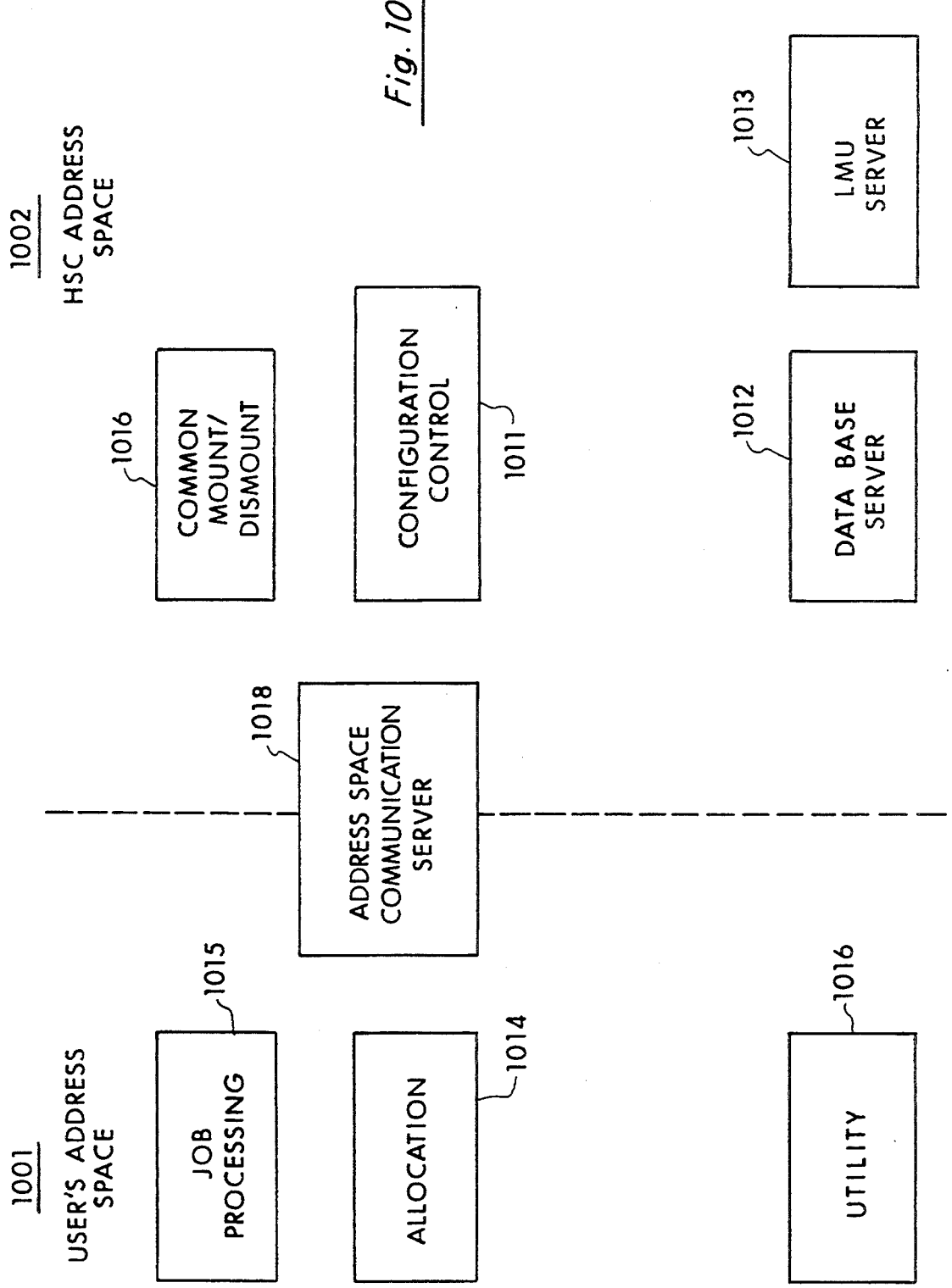
FIG. 10 illustrates the software architecture of the control software of the automated library system.

FIG. 10 illustrates in block diagram form the architecture of library software 110 which resides in host computer 101. The library software architecture is divided into two segments, a first segment 1001 consists of software routines located in the user's address space of host computer 101, while the second portion 1002 consists of software components that are located in the host software component (HSC) address space. The software is divided up into these two segments in order to provide an interface between the host computer 101 and the automated cartridge library system 100 that is transparent to the application programs of computer system 101. This is accomplished by providing software routines in the host software component address space, which routines intercept the normal control messages that the host computer 101 uses to request the mounting and dismounting of media elements. These control messages are then used to activate the automated cartridge library system 100. In this fashion the host computer applications need not be modified in order to support the installation of the automated cartridge library system 100.

In order to accomplish this function, a number of software routines are provided in the host software component architecture. These software routines include configuration control 1011, which provides coordination and control of the library which is used to store data to identify media element volume identifiers and the physical location of each media cartridge. Data base server 1012 provides control of the library control data base itself. LMU server 1013 provides a communication interface for each of the library module units 121 in the automated cartridge library system 100. Allocation software module 1014 translates a request for a drive allocation to take place into the identification of a particular available drive element within the automated cartridge library system 100. Job processing software component 1015 converts host computer data file request messages into control messages which are transmitted to the mount/dismount software component 1017. The mount/dismount software component 1017 receives these control messages and performs the requested media element mount or dismount operation by transmitting control signals through LMU server 1013 to the particular library management unit 121 associated with the selected automated cartridge library system 100. In addition, utility and administrative software 1016 is provided to generate administrative reports on the operation of the library resources as well as to provide maintenance installation and control interfaces with the host computer.

Media Described by Use of Esoteric Names

Figure 14:
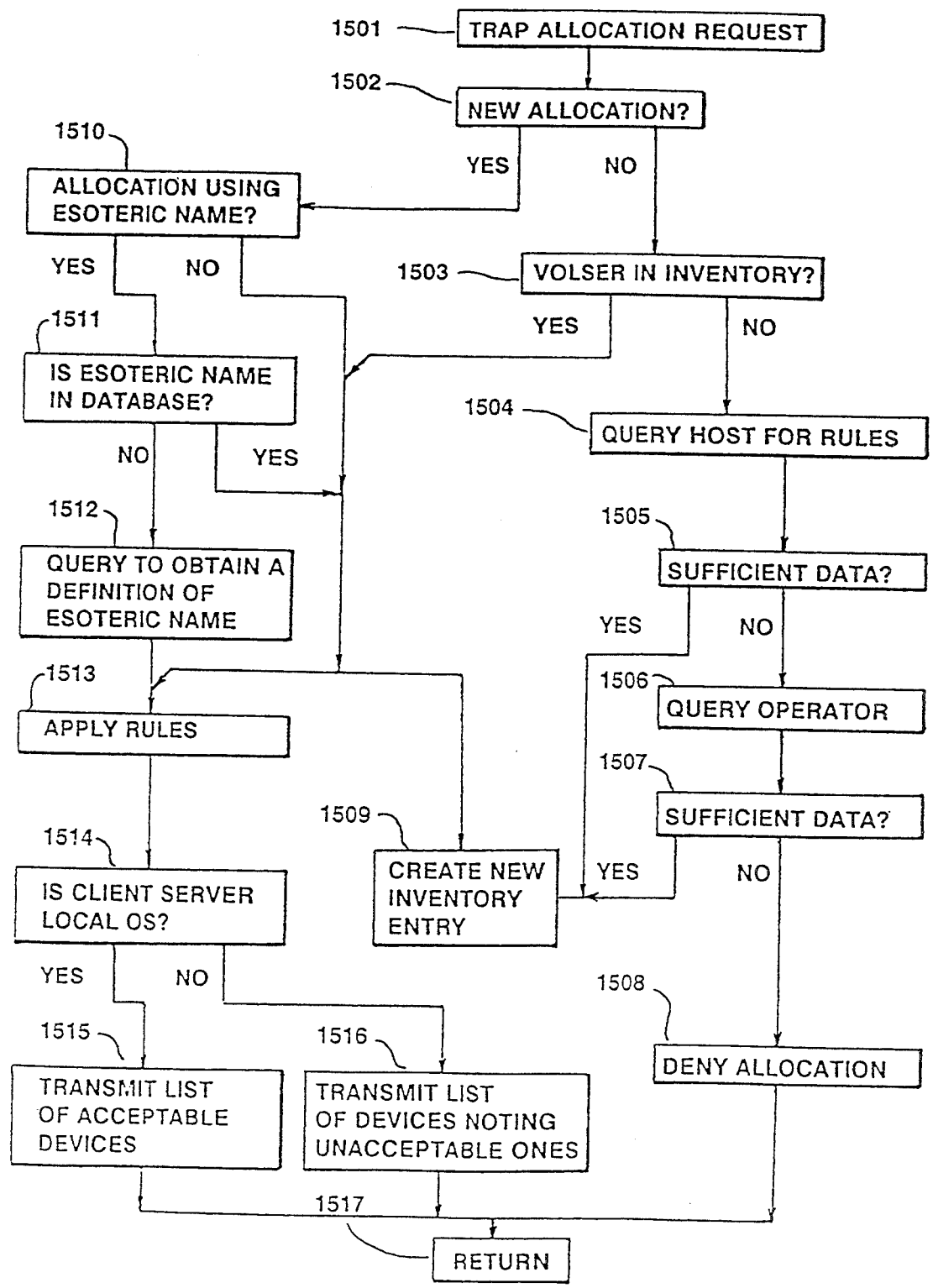
FIG. 14 illustrates, in flow diagram form, the operational steps taken by the removable media management system to activate and control the transport of a cartridge from a storage location to a designated drive.

FIG. 14 illustrates in flow diagram form the device allocation process. At step 1501, a user on one of the host computer systems, such as 101, requests access to a particular set of data which is to be stored on a media element located in one of library modules 111, 112. Assume for the purpose of this description that at step 1502, automated cartridge library software 110 determines that this is not a new allocation request. If this is not a new allocation request, host computer 101 will have identified the particular data set in its data set catalog and identified a particular volume serial number (VOLSER) which identifies the particular media element that contains the data set that is to be accessed. At step 1503, automated cartridge library software 110 analyzes the VOLSER received from host computer 101 to determine whether this particular media element is stored within one of library modules 111, 112. If the particular VOLSER is not stored in these library modules, at step 1504, automated cartridge library software 110 queries host computer 101 to obtain data indicative of the installation rules associated with this new particular media element. At step 1505, automated cartridge library software 110 reviews the received data to determine whether sufficient data has been provided by host computer 101 to uniquely identify this particular media element as defined by the VOLSER and rules received from host computer 101. If sufficient data has not been received at step 1505, at step 1506, automated cartridge library software 110 queries the operator at host computer 101 to obtain additional information. At step 1507, the automated cartridge library software 110 reviews the data received from the operator and if sufficient data still has not been received at step 1508 the allocation request is denied and processing returns to host computer 101 at step 1517. If sufficient data has been received at either step 1505 or 1507 to uniquely identify the particular VOLSER and the installation rules, at step 1509 automated cartridge library software 110 creates a new inventory entry identifying this particular media element and adds this entry to the existing inventory of media element stored in library modules 111, 112.

Once the VOLSER has been determined at step 1503 to be in the inventory or a new inventory entry is created at step 1509, processing advances to step 1513 where the automated cartridge library software 110 applies the rule in the rules database to influence allocation. However, before describing the details of the allocation, step 1502 is again reviewed wherein if this is a new allocation, processing advances to step 1510 where automated cartridge library software 110 determines whether the allocation request received from host computer 101 is using an esoteric name. If not, processing again advances to step 1513. However, if an esoteric name is used by the host computer 101, at step 1511, automated cartridge library software 110 determines whether this esoteric name is maintained in the rules database. If it is, allocation can be processed and processing advances to step 1513. However, if the esoteric name used by host computer 101 is a new esoteric name, automated cartridge library software 110 queries the host computer 101 and/or the operator to obtain definition of the esoteric name. These esoteric names are created to identify both the form and function of the particular device and media associated therewith. Therefore, esoteric names such as archive tape, fast disk, etc. can be used to define subsets of devices within the data storage system to direct certain data sets to appropriate destinations on media elements used within the data storage system. These esoteric names can be representative of the characteristics of the associated devices or these functions noted by the esoteric names can be emulated by devices contained within the data storage system without host computer 101 being aware of the true characteristics of the device on which the data set is written.

Therefore, at step 1513, once a particular VOLSER in inventory has been identified, either specifically by host computer 101 or by use of the esoteric names and the associated mapping tables, at step 1513, the automated cartridge library software 110 applies the rules contained in the rules database in order to map the host computer 101 allocation request into a particular real device that is used to store the data set for host computer 101. If, at step 1514, the client server is a local operating system, the automated cartridge library software 110 transmits the list of acceptable devices at step 1515 to the host computer 101 to identify available drive elements that can be used by host computer 101 to mount the requested data element. If, at step 1514, automated cartridge library software 110 determines that the local operating system is the not the requesting element, a list of devices is transmitted to the client server which may be a remotely located processor on a data network, and this list of devices contains an annotation thereto indicative of the unacceptable devices that are associated with the data storage system. In either case, processing returns at step 1517 to host computer 101 and the automated cartridge library 100 awaits requests from host computer 101 to mount the identified VOLSER on one of the identified acceptable drive elements.

The allocation and use of the particular rules at step 1513, has been described above with respect to the mapping tables and the mounting of a scratch media element and are not described in additional detail with respect to FIG. 14. Suffice it to say, that the mapping tables as described above contain sufficient information to enable the automated cartridge library software 110 to map a host computer request to a particular drive element and media element that provide the data storage capacity and data management characteristics required for this particular data set.

Volume Mount Operation

When host computer 101 requests that a designated media element be mounted at step 1501, automated cartridge library software 110 intercepts this command and activates job processing software 1015 which, through LMU server software 1013, insures that the drive element is available. If the drive element is available, job processing software 1015 transmits robot arm control commands through LMU server software 1013 package which transmits these commands to the library management unit 121. The library management unit 121 transmits these adapted control messages over a data link 162. Library management unit 121 takes the control messages transmitted from host computer 101 by way of automated cartridge library software 110 and adapts these commands to operate the robot arm in library module 111.

The control messages received from automated cartridge library software 110 and library management unit 121 consists of an information storage volume or media element mount command, an indication of which library module 111 the media element resides, its exact physical location in library module 111, where the physical location is designated by a panel in the media element storage array and a row/column indication of where on this particular panel the media element is stored. In addition, control signals indicate the destination library module 112 so that library module 111 is instructed to transfer the retrieved media element through pass through port 150 to library module 112. Library management unit 121 utilizes the received control signals to position the robot arm so that the retrieval mechanism, the robot hand is positioned to the correct panel/row/column location associated with the designated media element to be retrieved. The vision system on the robot arm examines the identification label on the media element and when the identification is verified as matching that indicated by host computer 101, the robot hand is extended, the media element is grasped and removed from the storage cell in which it has been placed. The robot hand retracts the media element and once the media element has cleared the side of a particular storage cell, the robot mechanism is relocated to an alignment with the pass through port. Library management unit 121 signals library module 111 to insert the retrieved media element into the transport storage cells and the robot hand is extended and the media element placed in an available one of the transport storage cells. The hand is then retracted and the robot arm is available for any other media element retrieval operation.

Library management unit 121 in response to the placement of the retrieved media element in one of transport storage cells 801 in pass through port 150 transmits control signals to pass through port 150 to activate the drive mechanism therein to transport the transport storage cells with the retrieved media element from the first library module 111 to the second library module 112. As discussed above, in response to these control signals the pass through port mechanism relocates the transport storage cells from an alignment within the first library module 111 through the horizontal distance separating the two library modules to an alignment with the robot arms in the second library module 112. Upon the completion of this transfer, a sensor is activated in pass through port 150 which sensor transmits a signal to library management unit 121 to indicate that the pass through port operation has been completed. The library management unit 121 in a response to the signals received from pass through port 150, signals the robot arm in library module 112 to move the retrieved media element from pass through port 150 to the selected media drive 211. Once the robot arm loads the media element and drive element 211, media control unit 131 interconnects drive element 211 with host computer 101 by way of data paths 175 and 173.

While a specific embodiment of this invention has been disclosed herein, it is expected that those skilled in the art can design other embodiments that differ from this particular embodiment but fall within the scope of the appended claims.

We claim:

1. A media storage allocation apparatus, connected to at least one associated computer system, for controlling the storing and retrieving of a plurality of media elements having substantially uniform exterior dimensions, each of said media elements being stored in one of a plurality of uniform size media element storage locations which are formed in an array adapted to receive and store media elements, via at least one media transferring element which transfers said media elements between said uniform Size media element storage locations and a number of drive elements which are connected to said at least one associated computer system to read and write data thereon, comprising:

means for storing data indicative of at least two sets of media elements, each Of said at least two sets of media elements representing media elements having a combination of media element attributes common to that set of media elements and differing from combinations of media element attributes found in others of said at least two sets of media elements;

means for storing data indicative of at least two sets of drive elements, each of said at least two sets of drive elements representing drive elements having a combination of drive attributes common to that set of drive elements and differing from combinations of drive element attributes found in others of said at least two sets of drive elements;

means for storing data indicative of at least one media transferring element, each of said at least one media transferring elements being associated with a plurality of said drive elements for transferring media elements between said uniform size media storage locations and said associated plurality of said drive elements;

means, responsive to said at least one associated computer system requesting access to a media element stored in one of said uniform size media storage locations, for identifying at least one of said drive elements having drive element attributes that correspond to said media element attributes required for processing said requested media element;

means, responsive to said identifying means for selecting at least one of said at least one media transferring elements associated with said identified at least one drive elements; and means for activating said selected at least one of said at least One media transferring elements to transfer said requested media element from said uniform size media storage location to said identified at least one drive elements.

2. The media storage allocation apparatus of claim 1 wherein said identifying means includes:

means for mapping each of said at least two sets of media elements to at least one of said at least two sets of drive elements.

3. The media storage allocation apparatus of claim 2 wherein said identifying means further includes:

means, responsive to said mapping means, for generating a prioritized list of drive elements which are included in said at least one of said at least two sets of drive elements; and means, responsive to said generating means, for selecting a single one of said drive elements from said prioritized list of drive elements.

4. The media storage allocation apparatus of claim 1 wherein said identifying means includes:

means, responsive to a user-defined set of allocation rules, for identifying a subset of said identified at least one drive elements.

5. The media storage allocation apparatus of claim 1 wherein said media element attributes include type of media in a media element.

6. The media storage allocation apparatus of claim 1 wherein said media element attributes include exterior physical features of said media elements.

7. The media storage allocation apparatus of claim 1 wherein said media element attributes include data recording format used on said media elements.

8. The media storage allocation apparatus of claim 1 wherein said media element attributes include data management characteristics of data stored on said media elements.

9. The media storage allocation apparatus of claim 1 wherein said drive element attributes include type of media that can be accepted by a drive element.

10. The media storage allocation apparatus of claim 1 wherein said drive element attributes include exterior physical features of said media elements that can be accepted by a drive element.

11. The media storage allocation apparatus of claim 1 wherein said drive element attributes include data recording formats supported by said drive elements.

12. The media storage allocation apparatus of claim 1 wherein said drive element attributes include data management characteristics of data stored on said media elements loaded into said drive elements.

13. A media storage allocation apparatus, connected to at least one associated computer system, for controlling the storing and retrieving of a plurality of media elements having substantially uniform exterior dimensions and each containing one of a number of different types of media, said media elements being stored in a plurality of uniform size media element storage locations which are formed in an array adapted to receive and store said media elements, via at least one media transferring element which transfers said media elements between said uniform size media element storage locations and a number of drive elements which are connected to said at least one associated computer system to read and write data thereon, comprising:
  means for storing data indicative of at least two sets of media elements, each of said at least two sets of media elements representing media elements having a common type of media contained therein;
  means for storing data indicative of at least two sets of drive elements, each of said .at least two sets of drive elements representing drive elements that accept media elements having a common type of media therein;
  means for storing data indicative of at least one media transferring element, each of said at least one media transferring elements serving a plurality of said drive elements;
  means, responsive to said at least one associated computer system requesting access to a media element stored in one of said uniform size media storage locations, for identifying at least one of said drive elements that accepts a type of media that corresponds to said media in said requested media element;
  means, responsive to said identifying means for selecting at least one of said at least one media transferring elements that serves said identified at least one drive element; and
  means for activating said selected at least one of said at least one media transferring elements to transfer said requested media element from said uniform size media storage location to said identified at least one drive elements.

14. The media storage allocation apparatus of claim 13 wherein said identifying means includes:
  means for generating a prioritized list of drive elements which accept a type of media that corresponds to said media contained in said requested media element; and
  means, responsive to said generating means, for selecting a single one of said drive elements from said prioritized list of drive elements.

15. The media storage allocation apparatus of claim 13 wherein said identifying means includes:
  means, responsive to a user-defined set of allocation rules, for identifying a subset of said identified at least one drive elements.

16. The media storage allocation apparatus of claim 13 wherein said at least one of said at least two sets of media elements is further subdivided into subsets defined by exterior physical dimensions of said media elements.

17. The media storage allocation apparatus of claim 13 wherein said at least one of said at least two sets of media elements is further subdivided into subsets defined by data recording format used on said media elements.

18. The media storage allocation apparatus of claim 13 wherein said at least one of said at least two sets of media elements is further subdivided into subsets defined by data management characteristics of data stored on said media elements.

19. The media storage allocation apparatus of claim 13 wherein said at least one of said at least two sets of drive elements is further subdivided into subsets defined by exterior physical features of said media elements that can be accepted by said drive elements.

20. The media storage allocation apparatus of claim 13 wherein said at least one of said at least two sets of drive elements is further subdivided into subsets defined by data recording format used on said drive elements.

21. The media storage allocation apparatus of claim 13 wherein said at least one of said at least two sets of drive elements is further subdivided into subsets defined by data management characteristics of data stored on said media elements loaded into said drive elements.

22. In a media storage allocation apparatus, wherein a plurality of uniform size media element storage locations, each adapted to receive and store one of a plurality of media elements having substantially uniform exterior dimensions and each containing one of a number of different types of media, wherein said uniform size media storage locations are served by at least one media transferring element for storing and retrieving media elements for placement into a number of drive elements connected to at least one associated computer system to read and write data thereon, a method of allocating the placement of said media elements in a drive element comprising the steps of:
  storing data indicative of at least two sets of media elements, each of said at least two sets of media elements representing media elements having a combination of media element attributes common to that set of media elements and differing from combinations of media element attributes found in others of said at least two sets of media elements;
  storing data indicative of at least two sets of drive elements, each of said at least two sets of drive elements representing drive elements having a combination of drive attributes common to that set of drive elements and differing from combinations of drive element attributes found in others of said at least two sets of drive elements;
  storing data indicative of ones of said drive elements served by each of said at least one media transferring elements;
  identifying, in response to said at least one associated computer system requesting access to a media element stored in one of said uniform size media storage locations, one of said drive elements having drive element attributes that correspond to said media element attributes associated with said requested media element;
  selecting one of said at least one media transferring elements that serves said identified one of said drive elements; and transferring said requested media element from said uniform size media storage location to said identified one of said drive elements via said selected said at least one media transferring element.

23. In the method of media storage allocation of claim 22 wherein said step of identifying includes:
mapping each of said at least two sets of media elements to at least one of said at least two sets of drive elements.

24. In the method of media storage allocation of claim 23 wherein said step of identifying further includes:
generating a prioritized list of drive elements which are included in said at least one of said at least two sets of drive elements; and
selecting a single one of said drive elements from said prioritized list of drive elements.

25. In a media storage allocation apparatus, wherein a plurality of uniform size media element storage locations are formed in an array, each of said uniform size media storage locations being adapted to receive and store one of a plurality of media elements having substantially uniform exterior dimensions and each containing one of a number of different types of media, served by at least one media transferring element for storing and retrieving a plurality of media elements for placement into a number of drive elements which are connected to at least one associated computer system to read and write data thereon, a method of allocating the placement of said media elements in a drive element comprising the steps of:
storing data indicative of at least two sets of said media elements, each of said at least two sets of media elements representing media elements having a common type of media contained therein;
storing data indicative of at least two sets of said drive elements, each of said at least two sets of drive elements representing drive elements that accept media elements having a common type of media therein;
storing data indicative of the ones of said drive elements served by each of said at least one media transferring elements;
identifying, in response to said at least one associated computer system requesting access to one of said media elements stored in one of said uniform size media storage locations, one of said drive elements that accepts a type of media that corresponds to media contained in said requested media element;
selecting one of said at least one media transferring elements that serves said identified one of said drive elements; and
transferring said requested media element from said uniform size media storage location to said identified one of said drive elements via said selected at least one media transferring element.

26. In the method of media storage allocation of claim 25 wherein said step of identifying includes:
mapping each of said at least two sets of media elements to at least one of said at least two sets of drive elements.

27. In the method of media storage allocation of claim 26 wherein said step of identifying further includes:
generating a prioritized list of drive elements which are included in said at least one of said at least two sets of drive elements; and
selecting a single one of said drive elements from said prioritized list of drive elements.

28. A media storage allocation apparatus, connected to at least one associated computer system, for controlling the storing and retrieving of a plurality of media elements having substantially uniform exterior dimensions and each containing one of a number of different types of media which are stored in a plurality of uniform size media element storage locations formed in an array, each of said uniform size media element locations being adapted to receive and store one of said media elements, via at least one media transferring element which transfers said media elements between said uniform size media element storage locations and a number of drive elements which are connected to said at least one associated computer system to read and write data thereon, comprising:
means for storing data indicative of a correspondence between each one of said media elements stored in said uniform size media storage locations and at least one of said drive elements, said correspondence representing drive element attributes that are in common with media element attributes of said one media element;
means for storing data indicative of the ones of said drive elements served by each of said at least one media transferring elements; and
means, responsive to said at least one associated computer system requesting access to a media element stored in one of said uniform Size media storage locations, for activating one of said at least One media transferring elements to transfer said requested media element from said uniform size media storage location to one of said corresponding drive elements.

29. The media storage allocation apparatus of claim 28 wherein said correspondence includes type of media contained in said media element.

30. The media storage allocation apparatus of claim 28 wherein said correspondence includes exterior physical features of said media elements.

31. The media storage allocation apparatus of claim 28 wherein said correspondence includes data recording format used on said media elements.

32. The media storage allocation apparatus of claim 28 wherein said correspondence includes data management characteristics of data stored on said media elements.

* * * * *